US012353414B2

United States Patent
Venugopal et al.

(10) Patent No.: US 12,353,414 B2
(45) Date of Patent: Jul. 8, 2025

(54) DATABASE QUERY OPTIMIZATION BASED ON ANALYTICS

(71) Applicant: INTERNATIONAL BUSINESS MACHINES CORPORATION, Armonk, NY (US)

(72) Inventors: Srikumar Venugopal, Dublin (IE); Alessandro Pomponio, Dublin (IE); Vasileios Vasileiadis, Dublin (IE); Stefano Braghin, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/311,968

(22) Filed: May 4, 2023

(65) Prior Publication Data
US 2024/0370434 A1    Nov. 7, 2024

(51) Int. Cl.
*G06F 16/245*    (2019.01)
*G06F 11/34*    (2006.01)
*G06F 16/2453*    (2019.01)

(52) U.S. Cl.
CPC .... *G06F 16/24545* (2019.01); *G06F 11/3419* (2013.01); *G06F 16/24539* (2019.01)

(58) Field of Classification Search
None
See application file for complete search history.

(56) References Cited

U.S. PATENT DOCUMENTS

| 6,112,198 | A | 8/2000 | Lohman | |
|---|---|---|---|---|
| 7,031,958 | B2 | 4/2006 | Santosuosso | |
| 11,636,108 | B1* | 4/2023 | Xu | G06F 16/256 707/714 |
| 2011/0320434 | A1* | 12/2011 | Carston | G06F 16/24542 707/718 |
| 2012/0136850 | A1* | 5/2012 | Barsness | G06F 16/24547 707/720 |
| 2015/0112966 | A1* | 4/2015 | Tokuda | G06F 16/24549 707/718 |

(Continued)

FOREIGN PATENT DOCUMENTS

CN  102163195 B  8/2011

OTHER PUBLICATIONS

Cheng, et al., "Efficient Skew Handling for Outer Joins in a Cloud Computing Environment", IEEE Transactions on Cloud Computing, vol. 6, No. 2, Apr.-Jun. 2018, IEEE, 14 pgs., Downloaded on Mar. 30, 2023 from IEEE Xplore, <https://ieeexplore.ieee.org/document/7293664>.

(Continued)

*Primary Examiner* — Son T Hoang
(74) *Attorney, Agent, or Firm* — Lily Neff

(57) ABSTRACT

A method, computer system, and a computer program product are provided for query management optimization in a distributed data management system. In one embodiment, at least one query is received. The query is then analyzed and related information associated with the query is obtained. When information exists in a database relating to previously executed queries similar to the received query, that information is obtained. A query execution plan is then formulated using any existing information and information relating to the similarly previously executed queries.

20 Claims, 4 Drawing Sheets

(56) References Cited

U.S. PATENT DOCUMENTS

| | | | | |
|---|---|---|---|---|
| 2016/0004754 | A1* | 1/2016 | Zoheir | G06F 16/24542 |
| | | | | 707/718 |
| 2016/0364447 | A1* | 12/2016 | Chen | G06F 16/2453 |
| 2017/0346875 | A1* | 11/2017 | Wells | G06F 16/24539 |
| 2018/0060394 | A1* | 3/2018 | Gawande | G06F 16/282 |
| 2018/0336247 | A1 | 11/2018 | Ignatyev | |
| 2019/0188298 | A1* | 6/2019 | Morris | G06F 16/27 |
| 2020/0073986 | A1* | 3/2020 | Purcell | G06F 16/21 |
| 2020/0349161 | A1 | 11/2020 | Siddiqui | |
| 2021/0133193 | A1* | 5/2021 | McConnell | G06F 16/2453 |
| 2021/0165793 | A1 | 6/2021 | Jeong | |
| 2021/0216572 | A1 | 7/2021 | Braghin | |
| 2022/0291964 | A1 | 9/2022 | Vasileiadis et al. | |
| 2022/0405626 | A1* | 12/2022 | Naveh | G06F 16/2455 |
| 2024/0126607 | A1* | 4/2024 | Royal | G06F 16/245 |

OTHER PUBLICATIONS

Dewitt, et al., "Practical Skew Handling in Parallel Joins", Department of Computer Sciences, University of Wisconsin-Madison, Jul. 14, 1992, 25 pgs., <https://pages.cs.wisc.edu/~dewitt/includes/paralleldb/vldb92.pdf>.

Sakr, et al., "A Survey of Large Scale Data Management Approaches in Cloud Environments", IEEE Communications Surveys & Tutorials, vol. 13, No. 3, Third Quarter 2011, IEEE, 26 pgs., Downloaded from IEEE Xplore on Mar. 30, 2023, <https://ieeexplore.ieee.org/document/5742778>.

Singh, et al., "Using Fuzzy Matching of Queries to Optimize Database Workloads", arXiv:2207.06820v1 [cs.DB], Jul. 14, 2022, 9 pgs.

Suresh, et al., "C3: Cutting Tail Latency in Cloud Data Stores via Adaptive Replica Selection", Proceedings of the 12th USENIX Symposium on Networked Systems Design and Implementation (NSDI '15), May 4-6, 2015, Oakland, CA, USA, USENIX Association, pp. 513-527, <https://www.usenix.org/conference/nsdi15/technical-sessions/presentation/suresh>.

Trummer, et al., "SkinnerDB: Regret-Bounded Query Evaluation via Reinforcement Learning", arXiv:1901.05152v1 [cs.DB], Jan. 16, 2019, 18 pgs.

Vassiliadis, et al., "Fast, Transparent, and High-Fidelity Memoization Cache-Keys for Computational Workflows", 2022 IEEE International Conference on Services Computing (SCC), IEEE, 11 pgs., Downloaded from IEEE Xplore on Mar. 30, 2023, <https://ieeexplore.ieee.org/document/9860151>.

* cited by examiner

DATABASE QUERY OPTIMIZATION BASED ON ANALYTICS

BACKGROUND

The present invention relates generally to the field of data management and more particularly to techniques for providing database query optimization using analytics.

A database management system (DBMS) performs many operations and handles large database structures. This often leads to DBMS having complex query execution processes. The complexity of these processes may be related to performance demand requirements imposed by many applications and their massive databases. Consequently, executing queries in a distributed data management system may be a complicated and expensive task. Modern databases and data warehouses are designed to be general purpose in nature, so that they can handle a wide variety of data schemas, types and formats.

Query optimization may be important to achieve the required heuristics of DBMS so as to sequence operations to provide the fastest query performance. However, queries are driven by applications, and are targeted to specific datasets. Prior art query optimizers currently apply the same principles to all queries and do not take into account application-specific attributes, or location and distribution of the datasets.

SUMMARY

Embodiments of the present invention disclose a method, computer system, and a computer program product for query management optimization in a distributed data management system. In one embodiment, when at least one query is received, it is analyzed. Related information associated with the query is obtained. In addition, when information exists in a database relating to previously executed queries similar to the received query, that information is obtained. A query execution plan is then formulated using any existing information and information relating to any previous similarly executed queries.

BRIEF DESCRIPTION OF THE SEVERAL VIEWS OF THE DRAWINGS

These and other objects, features and advantages of the present invention will become apparent from the following detailed description of illustrative embodiments thereof, which may be to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
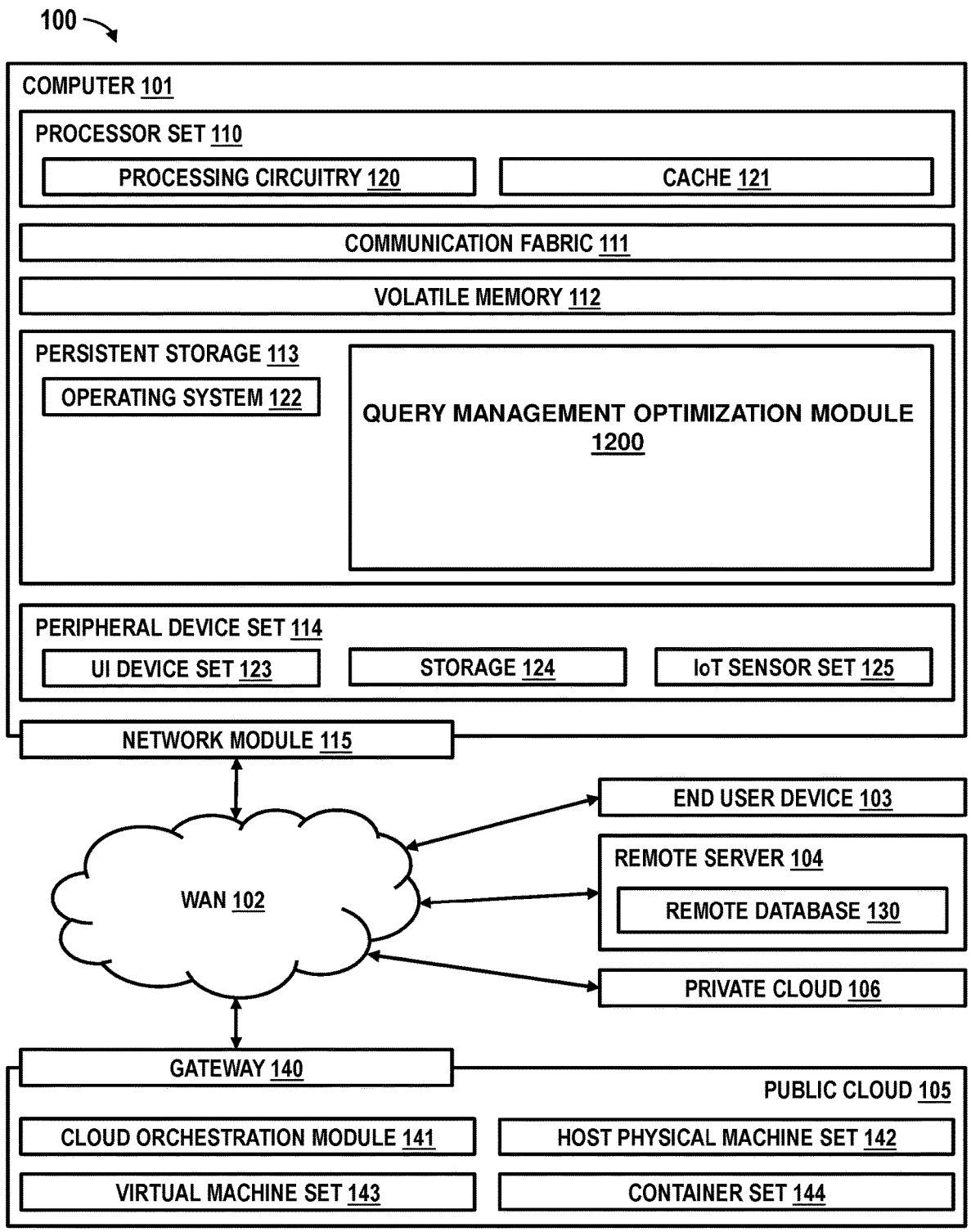
FIG. 1 illustrates a networked computer environment according to at least one embodiment.

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 provides a block diagram of a computing environment 100. The computing environment 100 contains an example of an environment for the execution of at least some of the computer code involved in performing the inventive methods, such as code change differentiator which is capable of providing a query management optimization module (1200). In addition to this block 1200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 1200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 of FIG. 1 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 1200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and rewriting of data. Some familiar forms of persistent storage include magnetic disks and solid state storage devices. Operating system 122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
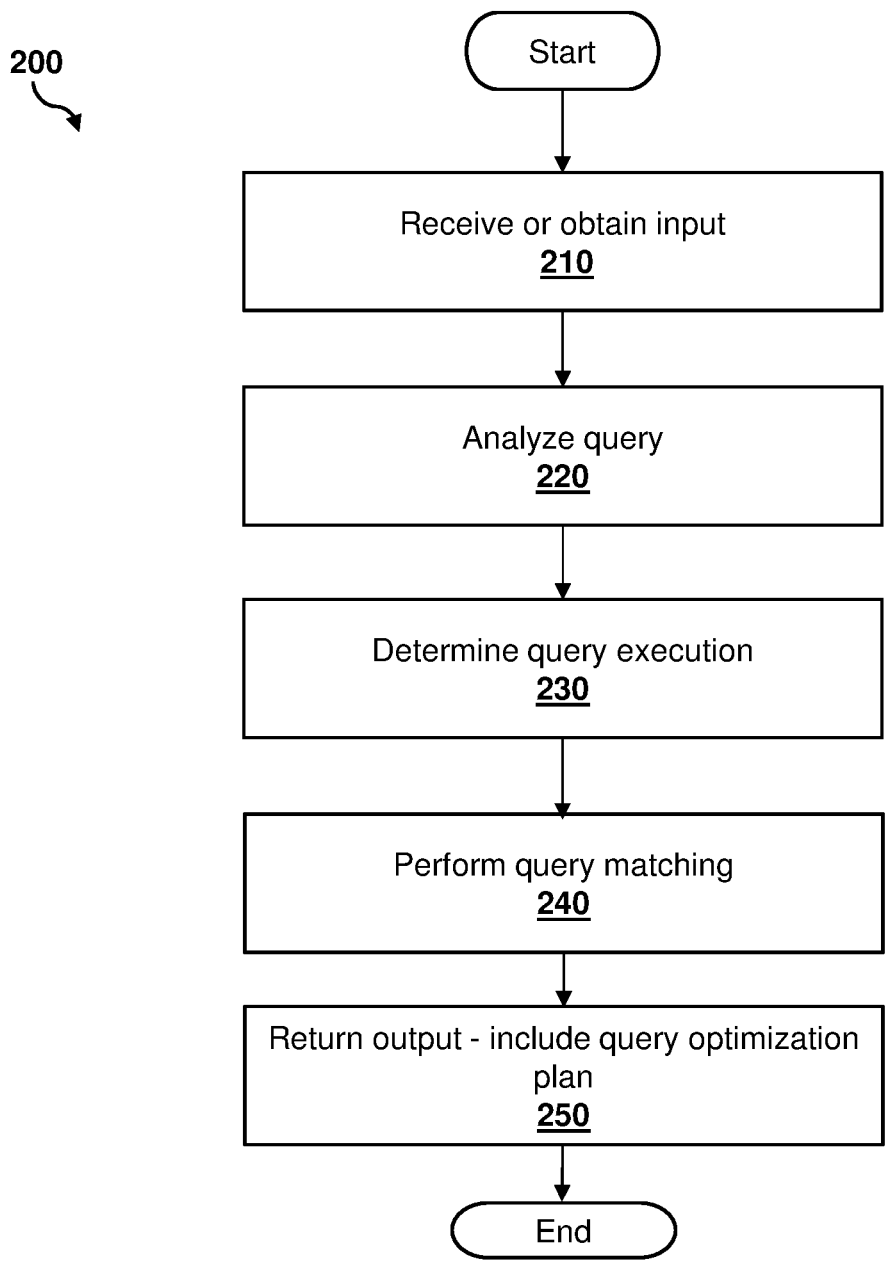
FIG. 2 provides an operational flowchart for providing query management optimization, according to one embodiment.

FIG. 2 provides a flowchart depiction of one embodiment to provide a query optimization management process 200. A database management (DBMS) often uses parallel query execution to satisfy the demands of the applications it supports. Parallelism may be achieved by partitioning one or more databases among a plurality of processors. Queries may be broken into subtasks based on the partitioning. These subtasks are then executed by one or more processors that may manage the partitions that contain the data required for their execution. The result of these subtasks eventually may be merged together to provide an output that in turn may be provided to a user. The partitioning property of the data may have an impact on how queries are divided into subtasks. As a result, data may have to be partitioned and repartitioned regularly in order for improving measures including but not limited to, the overall query performance and utilization of the database, among others. As discussed earlier, executing queries in a distributed data management system may be a complicated and expensive task. Query optimization uses heuristics to sequence operations to provide the fastest query performance. However, queries are driven by applications, and are targeted to specific datasets. Current query optimizers apply the same principles to all queries and do not take into account application-specific attributes, or location and distribution of the datasets.

Process 200 provides a mechanism of optimizing data placement by using query history. It also enhances the query execution by using empirically observed prior executions to inform future optimizations, including reusing operations that have led to performant queries. The process 200 also provides for a technique for measuring and improving effectiveness of query optimization techniques against real world execution environments where performance of queries with respect to data locations is measured in conjunction with other optimization operations (rewriting, subquery execution, index selection).

The process 200 enhances the performance of a query execution, especially on a large-scale distributed database(s). The query may be optimized by adding additional information to traditional databases, collected during actual execution time. Furthermore, this process may be further enhanced by recording the effect of query execution characteristics, including but not limited to the impact of query optimization strategy, query distribution strategy, data distribution information, machine/network performance and the like. Such characteristics are reported from the instrumentation of the underlying (and potentially heterogeneous) physical infrastructure.

To this end, as provided in Step 210, input may be obtained or received. The input includes at least one query that may have to be executed on data managed by a distributed database. In one embodiment, any context information may be determined that can potentially limit query optimization functionality.

In Step 220, once at least one query has been received or obtained, the query may be analyzed by locating previous observations obtained from already executed queries of the same or similar nature. More than one query may also be obtained simultaneously (or otherwise), and similar steps will be provided for each query.

The objective may be to optimize repeated query execution by grading outputs (of query optimization) against performance of queries in real world execution environments. This may lead to choosing the optimization with the highest performance in subsequent executions of the same query. Alternate but similar steps may also be taken to achieve the final output as presented in Step 250 (an optimized output can take all queries as a single output or individually according to alternate embodiments.)

In one embodiment, the analysis of these queries may include reviewing query signatures, optimization strategy applied, data location information, data movement information, and query performance. In addition, in one embodiment the query signatures can further include predicates, operations, data references and other similar components as can be appreciated by those skilled in the art.

In Step 230, determination may be made about query execution. In one embodiment, this determination may be made based on previous information and records relating to similar query execution. In one embodiment, this can include information about task performance, data locality, data node performance, query structure, query optimization results (transformation, parallelization, indexes, etc), and general query performance both in terms of execution time and data transfer (e.g., network usage).

Upon reception of each new query, a query matching step may be performed. This shown in Step 240 after completing the query determination step. In one embodiment this step can include, for example, identifying similar queries (or subqueries) and providing the related information to a query optimizer and one or more query executer modules. This information assists the query optimizer to speed up the transformation, while data locality and data node information assist in the selection of which specific data nodes to use to provide more performant query execution. In this manner, the query execution may be matched with the data nodes most appropriate to perform one or more tasks to complete the query.

In Step 250 an output may be returned. In one embodiment, this output will at least include an optimized and extended query execution plan according to optimization features (both traditional and advanced). This provides an optimized execution of the queries and a more streamline operation. In one embodiment, an optimized execution plan can be user defined. Nonetheless, in some embodiments, the general constraints may be still observed. As an example, a constraint may include energy efficiency, execution time, query throughput, data node load average, (internal/external) network efficiency, and more.

Figure 3:
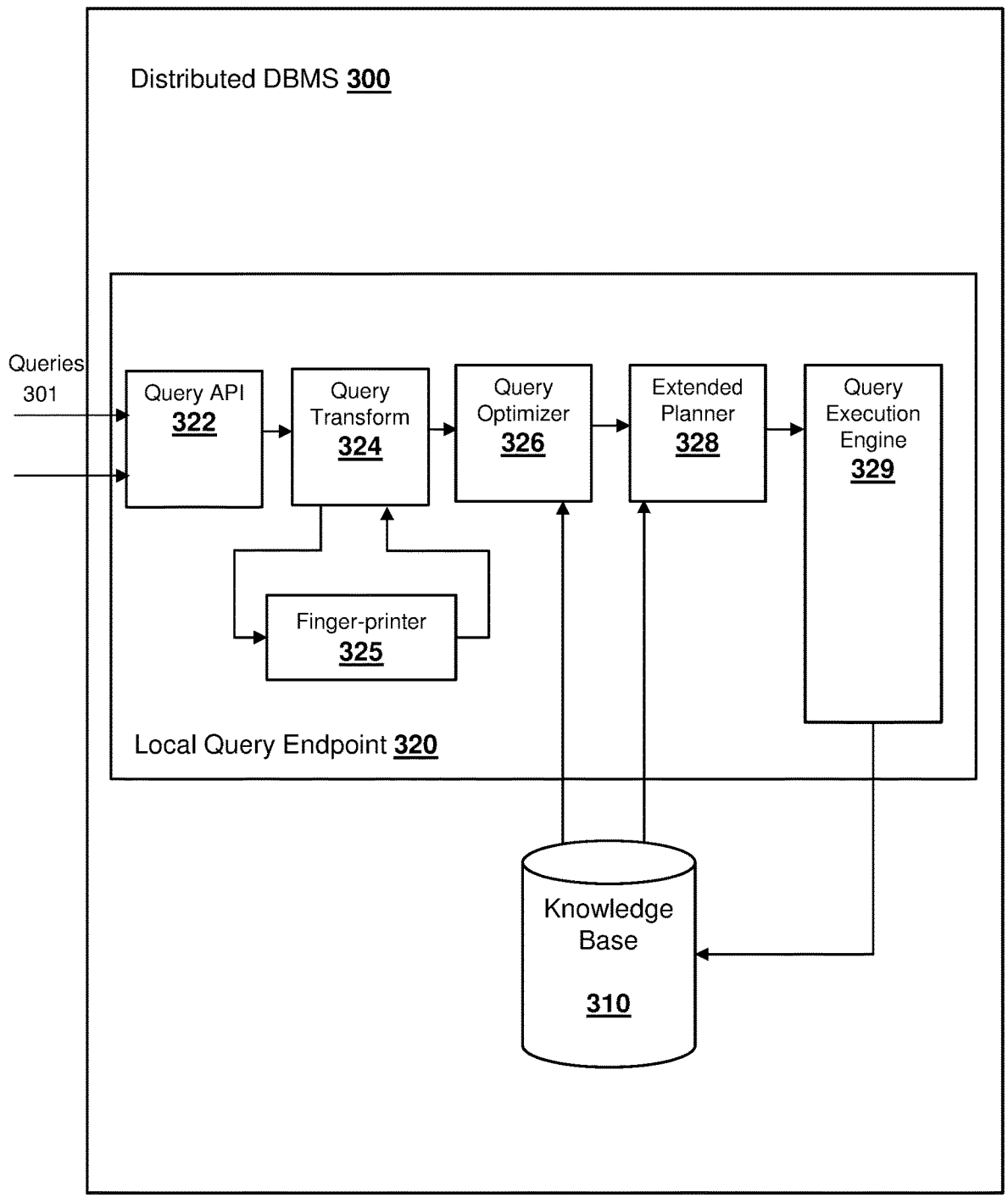
FIG. 3 provides a block diagram of an architectural view of the query management optimization system, according to one embodiment.

FIG. 3 provides a block diagram of an architectural view of an optimized management query system, such as the one discussed in conjunction with the process 200 of FIG. 2, as per one embodiment. As illustrated a number of queries referenced as 301 (query 1, query 2, ... query n) may be received by the distributed DBMS 300 which include a query endpoint 320. As can be appreciated by those skilled in the art, the DBMS 300 can be any number of distributed databases or as an extension of popular distributed databases.

These multiple queries 310 may be received by a Query API 320 and then converted by a query transformed 322 into internal algebra. These may be passed (as representations) on to the query fingerprinting module 325. In one embodiment, query fingerprinting can be implemented using semantic hashing (semhash) techniques, after an encoding of the query to highlight/isolate relevant features.

A query finger-printer 325 returns to the query transformer 324 an identifier obtained by encoding information about the transformed query structure, target objects (schema, table, column information), and predicate information (column name/value, predicate type). The query transformer 320 sends the internal representation of the query and its fingerprint to a query optimizer 326.

In one embodiment, the query optimizer 326 uses query signature to retrieve information about prior (similar) executions to guide optimization steps. Subsequently, an extended version of a query planner 328 will be provided for further use. This information may be to guide certain steps used in some embodiments such as index(s) selection and data node allocation/parallelization. This may all be shared and stored in a knowledge base 310.

In one embodiment, the knowledge base 310 may be storing the information about the prior can be implemented using traditional DBMS technology, or even using system schemas/tables.

Figure 4:
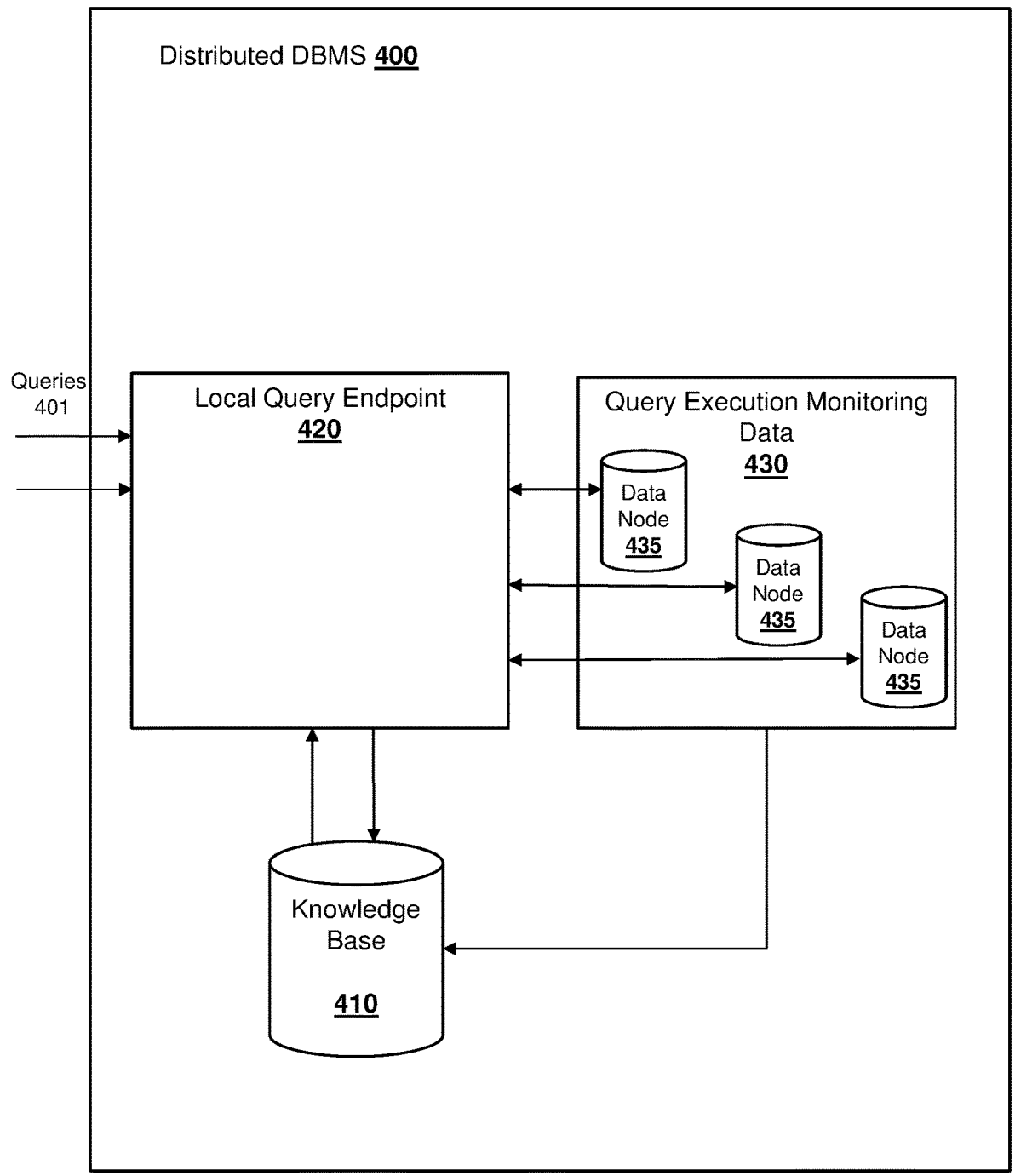
FIG. 4 provides a block diagram of an extended architectural view of the query management optimization system, according to one embodiment.

Once a query execution plan have been chosen (FIG. 2 at 250), a query execution engine 329 will write related metadata (such as query optimization and planning information) to the knowledge base 310. In one embodiment, the query execution record can be stored in a traditional database using query fingerprint as keys, retrieved using similarity matches implemented through User Defined Functions (UDFs), according to the specifics of the semhash utilized FIG. 4 provides a block diagram of an extended architectural structure as per FIG. 3. The DBMS system 400 receives queries 401 similar to FIG. 3. As illustrated, the query execution engine (see FIG. 3 at 329) of Local Query Engine 420 can start and complete the execution using a number of data node execution components referenced collectively as 435. These are a part of a query execution monitoring data module 430. In one embodiment, a monitoring agent can be used to continuously record metrics from the data nodes 435 to the knowledge based 410 for future mapping of sub queries.

The mechanisms discussed in conjunction with FIGS. 2-4, provide different ways of optimizing repeated query execution by grading outputs of query optimization against performance of queries in real world execution environments and choosing this optimization with the highest performance in subsequent executions of the same query. In one embodiment, the performance of one or more queries may be defined over attributes including, but not limited to, response time (or round-trip time) of query execution, throughput, and energy consumptions, and may be measured in conjunction with other traditional optimization operations (rewriting, subquery execution, index selection).

In one embodiment, the incoming queries are matched with query optimizations and performance measures recorded in a knowledge base where query matching may be defined over characteristics of query including, but not limited to, predicates, data access and join operations (also known as fingerprinting).

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for providing query management optimization, comprising:
    receiving at least a query in a distributed management system having a multiple scale distribution that includes a plurality of execution environments;
    analyzing the received query and obtaining any related information associated with the received query;
    determining an application specific and/or a location specific distribution of datasets stored within the distributed management system;
    dividing the received query into a plurality of subqueries, wherein said plurality of subqueries are performed in different execution environments such that the plurality of subqueries being distributed and run in parallel in the different execution environments;
    determining that existing information in a database relating to previously executed queries being similar to the received query;
    calculating and measuring effectiveness of query execution using a plurality of optimization techniques including running the plurality of subqueries in parallel executions through the determined application specific and/or location specific distribution of the datasets, and previous information associated with the plurality of subqueries, wherein the plurality of optimization techniques predict and formulate future optimizations of the received query based on a plurality of empirical data derived from any of the existing information in the database and other prior executions recorded relating to previously executed queries in the different execution environments;
    formulating a query execution plan for the received query after analyzing the calculated and measured effectiveness using the plurality of optimization techniques, wherein the formulated query execution plan considers the determined application specific and/or location specific distribution of the datasets and includes merging together tasks and data gathered after the run in parallel in the different execution environments; and
    executing the formulated query execution plan for the received query within the different execution environments.

2. The method of claim 1, further comprising:
    determining query matching prior to formulating the query execution plan to match the query execution with one or more execution modules provided in the distributed data management system.

3. The method of claim 2, wherein the query matching of the received query with the execution modules includes analyzing the received query characteristics with query requirements including predicates, data access and fingerprinting.

4. The method of claim 3, wherein the one or more execution modules include data nodes.

5. The method of claim 1, wherein the information about the received query and similar previously executed queries include query data locality, data node performance, and query structure.

6. The method of claim 1, wherein the information about the similar previously executed queries include query operations and query signatures having predicates and data references.

7. The method of claim 1, wherein a query performance time estimate and an estimate of data transfers time from one component to another in the distributed data management system is calculated prior to formulating the query execution plan.

8. The method of claim 1, wherein the distributed data management system includes a plurality of nodes and modules, and formulating the query execution plan includes node allocation and task parallelization of modules and nodes to perform the received query.

9. The method of claim 1, wherein a plurality of queries are received simultaneously and formulating the query execution plan includes a plan for each query.

10. The method of claim 9, wherein formulating the plan for each query also includes determining execution of all received queries together.

11. A computer system for providing optimized query management, comprising:
    one or more processors, one or more computer-readable memories and one or more computer-readable storage media;
    program instructions, stored on at least one of the one or more computer-readable storage media for execution by at least one of the one or more processors via at least one of the one or more memories, to receive at least a query in a distributed management system having a multiple scale distribution that includes a plurality of execution environments;
    program instructions, stored on at least one of the one or more computer-readable storage media for execution by at least one of the one or more processors via at least one of the one or more memories, to analyze the received query;

program instructions, stored on at least one of the one or more computer-readable storage media for execution by at least one of the one or more processors via at least one of the one or more memories, to obtain any related information associated with the received query;

program instructions, stored on at least one of the one or more computer-readable storage media for execution by at least one of the one or more processors via at least one of the one or more memories, to determine an application specific and/or a location specifics specific distribution of datasets stored within the distributed management system;

program instructions, stored on at least one of the one or more computer-readable storage media for execution by at least one of the one or more processors via at least one of the one or more memories, to divide the received query into a plurality of subqueries, wherein said plurality of subqueries are performed in different execution environments such that the plurality of subqueries being distributed and run in parallel in the different execution environments;

program instructions, stored on at least one of the one or more computer-readable storage media for execution by at least one of the one or more processors via at least one of the one or more memories, to determine that existing information in a database relating to previously executed queries being similar to the received query;

program instructions, stored on at least one of the one or more computer-readable storage media for execution by at least one of the one or more processors via at least one of the one or more memories, to calculate and measure effectiveness of query execution using a plurality of optimization techniques including running the plurality of subqueries in parallel executions through the determined application specific and/or location specific distribution of the datasets, wherein the plurality of optimization techniques predict and formulate future optimizations of the received query based on a plurality of empirical data derived from any of the existing information in the database and other prior executions recorded relating to previously executed queries in the different execution environments;

program instructions, stored on at least one of the one or more computer-readable storage media for execution by at least one of the one or more processors via at least one of the one or more memories, to formulate a query execution plan for the received query after analyzing the calculated and measured effectiveness using the plurality of optimization techniques, wherein the formulated query execution plan considers the determined application specific and/or location specific distribution of the datasets and includes merging together tasks and data gathered after the run in parallel in the different execution environments; and program instructions, stored on at least one of the one or more computer-readable storage media for execution by at least one of the one or more processors via at least one of the one or more memories, to execute the formulated query execution plan for the received query within the different execution environments.

12. The computer system of claim 11, wherein the computer system is a distributed data management system having a plurality of modules and nodes, further comprising:

program instructions, stored on at least one of the one or more computer-readable storage media for execution by at least one of the one or more processors via at least one of the one or more memories to determine query matching prior to formulating execution plan for any received queries to match with one or more execution modules provided in the distributed data management system.

13. The computer system of claim 12, wherein the program instruction to determine query matching of the received query with the execution modules includes analyzing the received query characteristics with query requirements including predicates, data access and fingerprinting.

14. The computer system of claim 13, wherein the program instruction to formulate the query execution plan includes node allocation and task parallelization of modules and nodes to perform the received query.

15. The computer system of claim 11, wherein the distributed data management system includes a plurality of nodes and modules, and formulating the query execution plan includes node allocation and task parallelization of modules and nodes to perform the received query.

16. The computer system of claim 11, further comprising:
program instructions, stored on at least one of the one or more computer-readable storage media for execution by at least one of the one or more processors via at least one of the one or more memories to obtain a plurality of queries simultaneously.

17. The computer system of claim 16, further comprising:
program instructions, stored on at least one of the one or more computer-readable storage media for execution by at least one of the one or more processors via at least one of the one or more memories to formulate query execution plans for each of the plurality of queries.

18. The computer system of claim 17, further comprising:
program instructions, stored on at least one of the one or more computer-readable storage media for execution by at least one of the one or more processors via at least one of the one or more memories to formulate a query execution plan for processing all of the plurality of queries simultaneously.

19. The computer system of claim 11, further comprising:
program instructions, stored on at least one of the one or more computer-readable storage media for execution by at least one of the one or more processors via at least one of the one or more memories to analyze information about the similar previously executed queries using query signatures including predicates and data references.

20. A computer program product for providing, optimized query management, the computer program product comprising:

one or more computer-readable storage media;

program instructions, stored on at least one of the one or more computer-readable storage media for execution by at least one of one or more processors via at least one of one or more memories, to receive at least a query in a distributed management system having a multiple scale distribution that includes a plurality of execution environments;

program instructions, stored on at least one of the one or more computer-readable storage media for execution by at least one of the one or more processors via at least one of the one or more memories, to analyze the received query;

program instructions, stored on at least one of the one or more computer-readable storage media for execution by at least one of the one or more processors via at least one of the one or more memories, to obtain any related information associated with the received query;

program instructions, stored on at least one of the one or more computer-readable storage media for execution by at least one of the one or more processors via at least one of the one or more memories, to determine an application specific and/or a location specifics specific distribution of datasets stored within the distributed management system;

program instructions, stored on at least one of the one or more storage computer-readable media for execution by at least one of the one or more processors via at least one of the one or more memories, to divide the received query into a plurality of subqueries, wherein said plurality of subqueries are performed in different execution environments such that the plurality of subqueries being distributed and run in parallel in the different execution environments, program instructions, stored on at least one of the one or more computer-readable storage media for execution by at least one of the one or more processors via at least one of the one or more memories, to determine that existing information in a database relating to previously executed queries being similar to the received query;

program instructions, stored on at least one of the one or more computer-readable storage media for execution by at least one of the one or more processors via at least one of the one or more memories, to calculate and measure effectiveness of query execution using a plurality of optimization techniques including running the plurality of subqueries in parallel executions through the determined application specific and/or location specific distribution of the datasets, and previous information associated with the plurality of subqueries, wherein the plurality of optimization techniques predict and formulate future optimizations of the received query based on a plurality of empirical data derived from any of the existing information in the database and other prior executions recorded relating to previously executed queries in the different execution environments;

program instructions, stored on at least one of the one or more computer-readable storage media for execution by at least one of the one or more processors via at least one of the one or more memories, to formulate a query execution plan for the received query after analyzing the calculated and measured effectiveness using the plurality of optimization techniques, wherein the formulated query execution plan considers the determined application specific and/or said location specific distribution of the datasets and includes merging together tasks and data gathered after the run in parallel in the different execution environments; and program instructions, stored on at least one of the one or more computer-readable storage media for execution by at least one of the one or more processors via at least one of the one or more memories, to execute the formulated query execution plan for the received query within the different execution environments.

\* \* \* \* \*